Patented Mar. 20, 1928.

1,663,100

UNITED STATES PATENT OFFICE.

CHARLES M. STINE, OF WILMINGTON, DELAWARE, ASSIGNOR TO E. I. DU PONT DE NEMOURS & COMPANY, OF WILMINGTON, DELAWARE, A CORPORATION OF DELAWARE.

COATING COMPOSITION CONTAINING RUBBER AND DRYING OILS AND METHOD OF MAKING SAME.

No Drawing.  Application filed December 19, 1923. Serial No. 681,648.

This invention relates to coating compositions, and particularly varnishes, in which a drying oil, such, for example, as linseed oil, is mixed with a varnish gum; and it comprises both a coating composition of this type in which the gum is crude or unvulcanized rubber, and a process of making such coating composition.

Hitherto, varnishes have been prepared ordinarily by the mixing of a drying oil with or without a drier, a natural or synthetic varnish gum or resin, and a thinner. Films from such varnish, however, when dry, are usually more or less brittle, so much so that their use is limited, since if applied to flexible surfaces such as cloth or rubber, they crack and their life is of short duration. Moreover, if exposed to moisture, these films absorb appreciable quantities of water which tends more or less to disintegrate the film.

I have discovered that films may be obtained which are more elastic, more waterproof, and more durable than films of the above type heretofore known by using crude or unvulcanized rubber or caoutchouc in the place of the varnish gums. When crude rubber is dissolved in benzene or other volatile solvent and added to the drying oil, it is possible to get a homogeneous solution which may be reduced to any desired consistency by the addition of a volatile thinner. I have discovered that when such a homogeneous solution is applied to a surface either by brush or spray, or in any other way, and heated at a moderate temperature, say 70–120° C., for a short time, the thinner is volatilized and the rubber and drying oil are reduced to the form of a hard, elastic, waterproof film which is more durable than the ordinary varnish film. I have also discovered that a drier, such, for example, as cobalt linoleate, not only accelerates drying of the oil, but also promotes an oxide cure of the rubber, and may therefore be termed a curing agent for the rubber.

The chemical reactions which take place during the drying have not yet been entirely worked out, but the film is probably formed from the oxides, peroxides and ozonides of rubber, combined or mixed with the ordinary oxidation products of the drying oil. It seems likely that both the drier and the oxides or peroxides formed in the preliminary drying of the drying oil serve as accelerating agents in promoting the reaction of the oxygen of the air with the caoutchouc; in other words, accelerate the oxide cure of the rubber.

The following formula (A) will illustrate the new varnish composition:—

Parts.

Crude rubber
  (20% solution in benzene) _____ 10.0
Linseed oil _____ 25.3
Drier (cobalt linoleate) _____ 0.25
  Mineral thinner to give desired body.

The solution of rubber in benzene, the linseed oil and the cobalt linoleate are agitated to form a homogeneous mixture and the mineral thinner added until the solution reaches the desired consistency. Such a varnish, when spread out in a thin film and heated at 70–120° C. for a short time, (5 hours is sufficient for the higher temperatures), gives a hard, elastic, water-proof film.

To illustrate the extent to which the composition of the new varnish may vary, the following table is given:

| Constituent | Parts | Remarks |
|---|---|---|
| 1. Crude rubber (20% solution in mineral thinner). | 10.0 | |
| 2. Linseed oil (bodied by heat treatment). | 3.9–31.0 | (5 to 40 gal. varnish.) |
| 3. Drier for oil (cobalt linoleate) | .0195–.1500 | (.5% on oil.) |
| 4. Mineral thinner to give desired body. | | |

The proportion of drier based on the oil may be increased from 0.5% as given above, to 5.0% if desired.

Again, I have discovered that it is possible to obtain homogeneous solutions when the drying oil, drier, caoutchouc, volatile solvent therefor, and thinner are mixed with a curing agent for the rubber, such as dinitrobenzene or the nitro derivatives of other aromatic hydrocarbons. I have found that when such homogeneous solution is applied to a surface either by brush or spray, or in any other way, and heated at a moderate temperature, say 100–140° C., for a short time, the thinner is volatilized and a hard, elastic film is formed which consists of the cured rubber and the dried oil. Such films are found to be much more flexible and elastic, more water-proof, and more durable than the ordinary varnish film.

The following formula (B) will illustrate a typical varnish composition containing a curing agent:—

| | Parts. |
|---|---|
| Rubber (20% solution in benzene) | 10.0 |
| Linseed oil | 7.8 |
| Dinitrobenzene | 0.3 |
| Thinner to reduce to the desired body. | |

The linseed oil, with or without a drier, is added to the benzene solution of the rubber. The dinitrobenzene dissolved in a small amount of the solvent is then added and agitated until a homogeneous solution is formed. More thinner is then added until the desired body is obtained. Such a varnish, when spread out in a thin film and heated at 100–140° C. for a sufficient time to vulcanize the film, (at the higher temperatures two hours is sufficient), gives a hard, elastic, water-proof film.

The range of proportions of this varnish (B) may be illustrated by, but is not limited to, the following table:

| Constituent | Parts | Remarks |
|---|---|---|
| 1. Crude rubber (20% solution in mineral thinner). | 10.0 | |
| 2. Linseed oil (bodied by heat treatment). | 3.9 to 23.4 | 5 to 30 gal. varnish. |
| 3. Drier (cobalt linoleate) | .0195 to .1170 | .5% on oil. |
| 4. Dinitrobenzene (curing agent) | .2 to .9 | 2% to 9% on rubber. |
| 5. Thinner to reduce to the desired body. | | |

Instead of the curing agent above described I may use a vulcanizing agent and an accelerator, for I have found that it is possible to obtain homogeneous solutions containing a vulcanizing agent and an accelerator in addition to a drying oil, a drier, rubber, a volatile solvent therefor, and a thinner. When such a homogeneous solution is applied to a surface either by brush or spray, or in any other way, and heated at a moderate temperature, say 100–130° C., the thinner is volatilized and the rubber is vulcanized, and the film, which consists of the vulcanized rubber and dried oil, is more flexible and elastic, more waterproof and more durable than the ordinary varnish film.

The following formula (C) will illustrate this third type of varnish:—

| | Parts. |
|---|---|
| Rubber (20% benzene solution) | 10.0 |
| Linseed oil (0.05% manganese borate) | 7.8 |
| Zinc oxide | 0.1 |
| Sulfur | 0.2 |
| Diphenyl-guanidine | 0.1 |
| Mineral thinner to give the required body. | |

The sulfur and zinc oxide are thoroughly milled into the rubber before dissolving in the benzene. This rubber solution, the linseed oil, and a solution of the diphenyl guanidine in a small amount of the thinner, are then mixed and agitated until a homogeneous solution is formed. The thinner is then added until the desired body is obtained. Such a varnish, when spread out in a thin film and heated at a temperature of 100–130° C. for a sufficient time to vulcanize the rubber, (at the higher temperature three hours is sufficient), gives a hard, elastic, waterproof film.

The ranges of proportions of ingredients of this composition (C) may be illustrated by the following table:

| Constituent | Parts | Remarks |
|---|---|---|
| 1. Crude rubber (20% solution in mineral thinner). | 10.0 | |
| 2. Linseed oil (bodied by heat treatment. | 3.9 to 31.2 | 5 to 40 gal. varnish. |
| 3. Drier (cobalt linoleate) | .0195 to .1560 | .5% on oil. |
| 4. Zinc oxide | .1 to .2 | 1% to 2% on rubber. |
| 5. Sulfur | .1 to .2 | 1% to 2% on rubber. |
| 6. Diphenyl guanidine | .05 to .1 | .5% to 1% on rubber. |
| 7. Mineral thinner to give required body. | | |

Varnish films of approximately the same degree of hardness may be obtained from varnishes of the above type varying in oil length from 5 to 40 gal. Where the diaryl substituted guanidines are used as accelerators, the addition of zinc oxide may in some cases be omitted. Zinc oxide assists the action of this type of accelerator somewhat but is not absolutely required. In a varnish formula of this type, it is evident that I am not confined to the use diphenylguanidine as an accelerator; for example, I may also use the carbon disulfide-amine reaction products and the thiurams, such as tetramethylthiuram disulfide and others.

The foregoing examples are, of course, purely illustrative and do not in any way limit me to the particular conditions or substances stated therein. Practically any drying oil may be used, any grade of crude or unvulcanized rubber, and any vulcanizing agent or accelerator.

The use of mineral thinner (gasoline, etc.) in the preparation of the rubber solution or cement has been found preferable to benzene.

The presence of manganese content (from the drier) in the varnish has been shown to exert a degrading action on the rubber in the film, sometimes resulting in tackiness. Cobalt drier, therefore is preferably used to avoid tackiness.

The mechanism of the oxide cure as effected by oxides or peroxides of the oils, as well as by oxygen compounds of rubber, both formed in the drying out process of the oil, is, in the writer's opinion, analogous to the oxide cures proposed by Ostromislenski.

That investigator claims that the ozonides of rubber can be used effectively as vulcanizing agents, and, further, that benzoyl peroxides, peracids, and substances of like nature functioned similarly as vulcanizing agents. Therefore, in the drying of oils and, particularly, under conditions of forced drying by heat, comparatively rapid oxidation takes place resulting, it is believed, in formation of oxygen compounds of rubber through which the vulcanization process is effected.

The films prepared in accordance with my invention are more flexible, more waterproof, and more durable than ordinary varnish films, and, on account of their increased flexibility and elasticity, may be applied not only to rigid surfaces such as metal and wood, but also to such flexible surfaces as cloth, leather, and paper.

To summarize, my invention comprises making a coating composition, and particularly a varnish or enamel, by mixing a drying oil and drier with crude or unvulcanized rubber instead of with a gum or fossil resin as has heretofore been customary and then effecting a cure of the rubber component of the mixture. An important feature of my invention is the discovery of the fact that the drying oil and the drier are both apparently capable of functioning as curing agents through their ability to combine with and transfer oxygen to the rubber.

I may, however, bring about the desired curing of the rubber by incorporating a special curing agent such as dinitrobenzene. The cure, either with or without a special curing agent, results from an oxidation of a small portion only of the rubber. Where the cure of the rubber is to be a sulfur cure (i. e. vulcanization, in the restricted sense) I may add sulfur and an accelerator. The ordinary baking treatment is usually sufficient to bring about vulcanization of the rubber.

As will, of course, be understood, my invention is applicable not only to the manufacture of varnishes, but also to the manufacture of enamels (i. e. color varnishes) which are distinguished from straight varnishes by the presence in the former of a suitable pigment.

Because of the much greater degree of flexibility which they possess, my new coating compositions are susceptible of many uses for which ordinary varnishes and enamels are not suited. Thus the new coating compositions may be used as coatings for fabrics, and for various articles which are normally subjected to considerable distortion or bending.

In addition to the ingredients of the coating composition mentioned above, various other ingredients may be incorporated to modify in various ways the physical and chemical properties of the new compositions. In place of linseed oil, I may use other drying oils such as perilla, soya bean, or fish oil (menhaden). Where perilla oil is substituted for linseed oil the proportions employed are the same by weight. And in place of diphenylguanidine, other vulcanization accelerators, for example di-o-tolylguanidine or anhydro-formaldehyde-paratoluidine, may be used.

By omitting part or all of the thinner, plastic compositions may be obtained by the process described above which may be readily molded and machined, the resulting articles having physical and chemical properties such as toughness, durability, and resistance to actinic light and to corrosion, which render such articles valuable in the arts.

I claim:

1. The process of preparing a coating composition which comprises mixing 10 parts of unvulcanized rubber with at least 3.9 parts of a drying oil and with another substance capable of promoting a cure of the rubber at an elevated temperature.

2. The process of preparing a coating composition which comprises mixing 10 parts of unvulcanized rubber with at least 3.9 parts of a drying oil, with a drier, and with another substance capable of curing the rubber at an elevated temperature.

3. The process of preparing a coating composition which comprises mixing 10 parts of unvulcanized rubber in solution in a rubber solvent with a drier and with from about 4 to 31 parts of a drying oil.

4. The process of preparing a coating composition which comprises mixing 10 parts by weight of unvulcanized rubber dissolved in a rubber solvent with from about 4 to 31 parts of a drying oil, and with an amount of drier equal to between 0.4 and 5.0% of the oil.

5. The process which comprises mixing 10 parts of unvulcanized rubber dissolved in a rubber solvent with from about 4 to 31 parts of a drying oil, and with an amount of a drier equal to between 0.4 and 5% of the oil, and heating the resulting composition in the form of a thin film to a temperature between about 70 and 125° C. to volatilize the solvent, oxidize the oil, and cure the rubber.

6. A composition containing 10 parts of uncured rubber, at least 3.9 parts of a drying oil, a drier, and a curing agent.

7. A coating composition comprising 10 parts of uncured rubber, from about 4 to 31 parts of a drying oil, a drier, and a thinner.

8. A composition as defined in claim 7 in which the proportion of drier is between 0.4% and 5.0% based on the weight of oil present.

9. A coating composition comprising uncured rubber, a vegetable drying oil, a drier, an amount of sulfur not in excess of 2% of the amount of rubber, a vulcanization accelerator, and a thinner.

10. A composition as defined in claim 6 in which the drying oil is perilla oil.

11. A composition as defined in claim 7 in which the drying oil is perilla oil.

12. A composition as defined in claim 8 in which the drying oil is perilla oil.

13. A composition containing uncured rubber, perilla oil, a drier, and a vulcanizing agent.

14. The process of preparing a coating composition which comprises mixing 10 parts of unvulcanized rubber with from about 4 to 31 parts of a drying oil and with a substance adapted to promote both the curing of the rubber and the oxidation of said oil.

In testimony whereof I affix my signature.

CHARLES M. STINE.